Figures 1, 2:
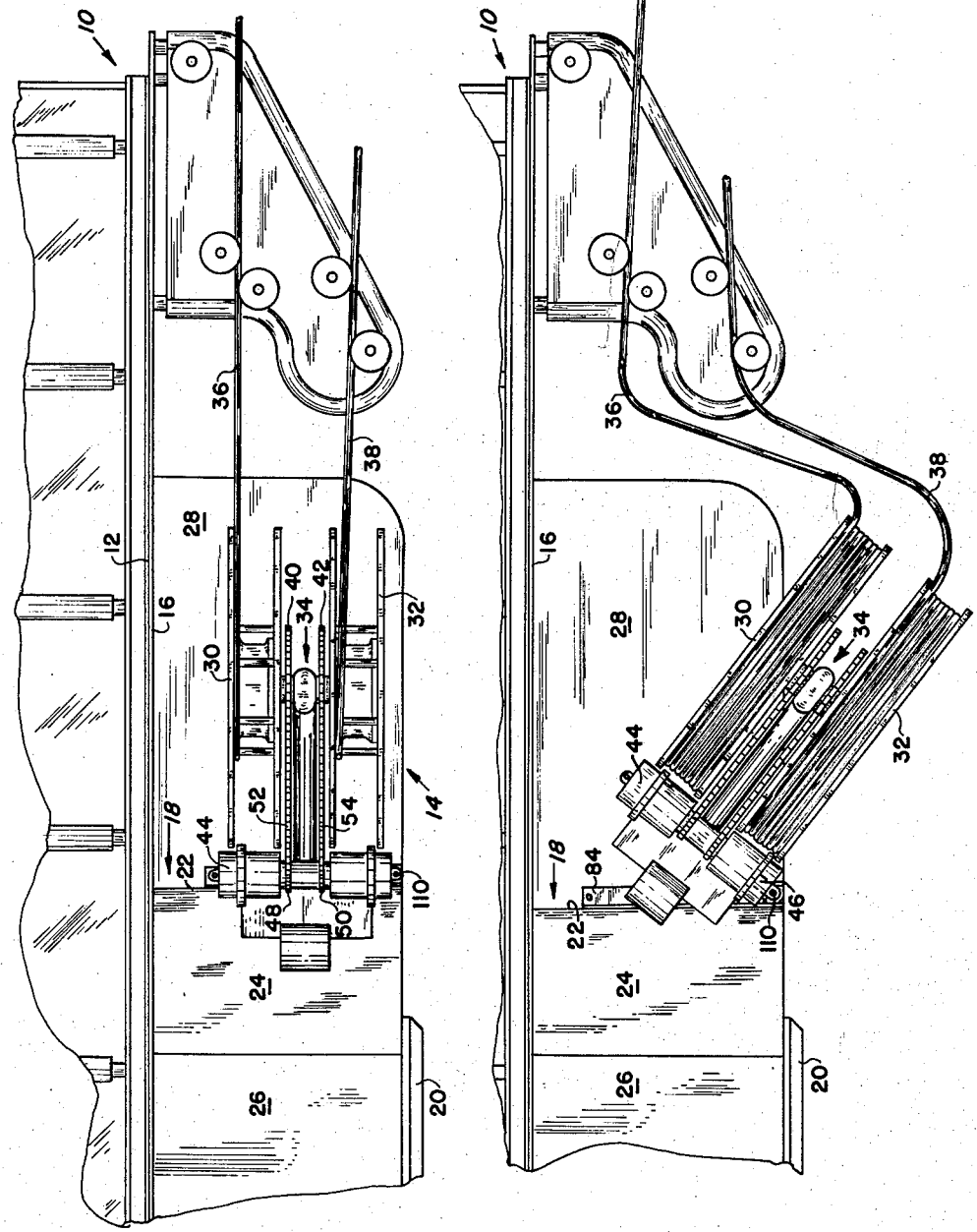

July 7, 1964

E. P. BUCKLEN 3,140,063

CABLE REEL SUPPORT

Filed Aug. 30, 1962

2 Sheets-Sheet 1

INVENTOR.
ELLIS P. BUCKLEN
BY
HIS ATTORNEY

July 7, 1964      E. P. BUCKLEN      3,140,063
CABLE REEL SUPPORT

Filed Aug. 30, 1962      2 Sheets-Sheet 2

INVENTOR.
ELLIS P. BUCKLEN
BY Stanley J Price
HIS ATTORNEY

United States Patent Office 3,140,063
Patented July 7, 1964

3,140,063
CABLE REEL SUPPORT
Ellis P. Bucklen, Columbus, Ohio, assignor to Consolidation Coal Company, Pittsburgh, Pa., a corporation of Pennsylvania
Filed Aug. 30, 1962, Ser. No. 220,440
6 Claims. (Cl. 242—86.51)

This invention relates to a cable reel support and more particularly to a cable reel support pivotally secured in a cable reel compartment.

In underground mining the vehicle used to transport the dislodged material from a continuously advancing mining machine to a fixed conveyor means is an automotive type vehicle propelled by electric motors. Power is supplied to the vehicle by means of a trailing cable which is connected at one end to a fixed source of power and at the other end to a cable reel rotatably secured to the frame of the vehicle. The cable reel is positioned in a compartment provided along the side of the vehicle. A drive mechanism is provided to pay out and reel in the cable on the cable reel as the vehicle shuttles toward and away from the source of power.

Recent advances in the use of a pair of single conductor cables to supply power to the vehicle presented problems in supporting the reels within the cable reel compartment. The single conductor cables are preferably spooled on separate reels positioned in spaced relation to each other. Each reel should have its own driving mechanism to reel in and pay out the cable. A rotary collector must be provided for each reel to conduct current from the cable on the reel to a fixed conductor. Since the rotary collectors have wearing parts, they should be accessible for maintenance and replacement.

Briefly, my invention comprises a cable reel support which is pivotally secured to an upstanding wall of the cable reel compartment. The reel support has a common horizontal cable reel carrier with tubular strut members extending rearwardly therefrom. The cable reels are rotatably supported in spaced relation to each other on the cable reel carrier with the tubular strut members therebetween. The tubular strut members are secured to horizontal support brackets. Horizontal fixed brackets are fixedly secured to the wall of the cable reel compartment. The support brackets are positioned on the horizontal fixed brackets and pivotally secured thereto at one end by means of pin members so that the entire reel support with the reels connected thereto can be pivoted outwardly from the vehicle and thereby provide access to the inner reel and its components. The driving motors for each of the reels are carried by my reel support so that maintenance of the separate drive motors may be accomplished without removal of the outer reel. I have also provided a universal arrangement wherein my support may be used with equal facility in a cable reel compartment located on either the left side or right side of the vehicle.

Accordingly, the principal object of this invention is to provide a cable reel support that is pivotally arranged on the vehicle.

Another object of my invention is to provide a cable reel support arranged to support a pair of cable reels in spaced relation to each other.

Another object of my invention is to provide a cable reel support that may be used in a cable reel compartment located on either the left side or the right side of the vehicle.

These and other objects and advantages of this invention will be more completely described and distinctly pointed out in the following specification, the accompanying drawings, and the appended claims.

Figures 3, 4:
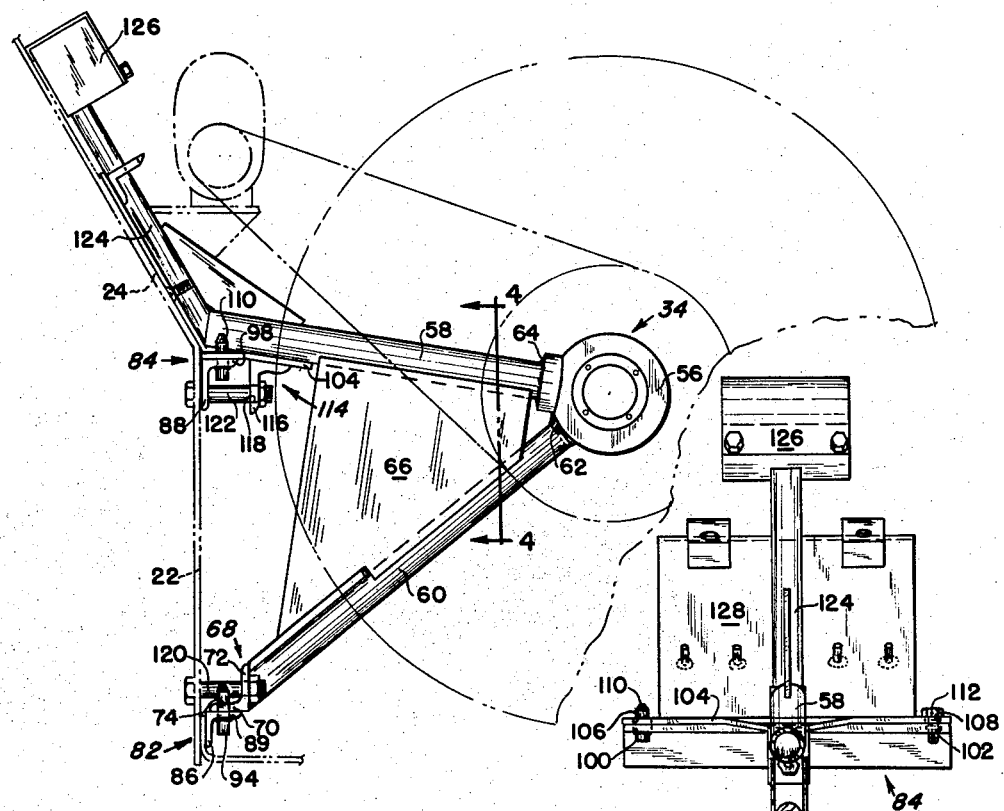
Figure 5:
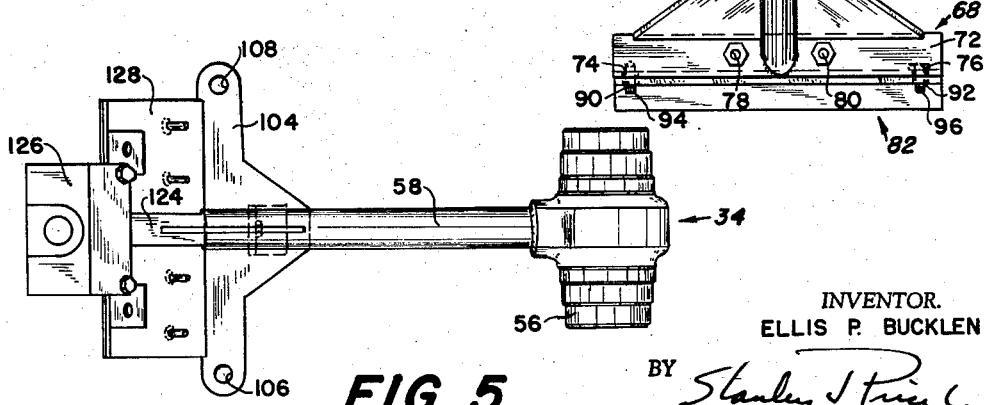

In the drawings:
FIGURE 1 is a top plan view of a portion of a shuttle car illustrating my improved cable reel device.
FIGURE 2 is a plan view similar to FIGURE 1 illustrating my improved cable reel support with the cable reel pivoted outwardly to provide access to the reel, drive motors and current collectors.
FIGURE 3 is a view in side elevation of my cable reel support.
FIGURE 4 is a view in front elevation taken along the line 4—4 of FIGURE 3 with the hydraulic motors removed from their supports.
FIGURE 5 is a top plan view of my cable reel support.

Referring to the drawings and particularly to FIGURES 1 and 2, there is shown a portion of a shuttle car that is similar to the shuttle car disclosed in Patent No. 2,754,015 dated July 10, 1956. The shuttle car generally designated by the numeral 10 is arranged to transport dislodged material from the working face to a fixed transportation means and is propelled by an electric motor, as is clearly described in the above patent. The shuttle car 10 has a side wall 12 with a cable reel compartment 14 extending laterally therefrom. The cable reel compartment is adjacent the front or unloading portion of the vehicle 10 and has a side wall 16 and a rear wall 18. The rear wall 18 serves as a fender for the wheel 20 and has a vertical portion 22, an upwardly extending portion 24, and a horizontal portion 26. The cable reel compartment 14 has a base plate or floor plate 28 extending forwardly from the rear wall vertical portion 22.

A pair of cable reels 30 and 32 are supported by means of a cable reel support generally designated by the numeral 34 within the cable reel compartment 14. The cable reels 30 and 32 are adapted to have single conductor cables 36 and 38 wound thereon. The cable reels 30 and 32 have sprockets 40 and 42 secured thereto on opposite sides of the reel support 34. A pair of hydraulic motors 44 and 46 are carried by the reel support 34 and have drive sprockets 48 and 50 associated therewith. Endless chains 52 and 54 connect the respective motors 44 and 46 to the cable reel sprockets 40 and 42. With this arrangement the cable reels 30 and 32 are independently controlled by the respective motors 44 and 46.

The cable reels 30 and 32 are both supported by a cable reel support generally designated by the numeral 34. The cable reel support 34 is illustrated in detail in FIGURES 3-5 and has a cylindrical cable reel carrier 56 with a pair of tubular struts 58 and 60 extending angularly and rearwardly therefrom. The struts 58 and 60 are secured to the cable reel carrier 56 by means of welds 62 and 64 and have a brace plate 66 secured therebetween. An angle support bracket 68 is secured to the lower portion of tubular strut 60 and has a horizontal leg 70 and a vertical leg 72. The horizontal leg 70 has a pair of apertures 74 and 76 located adjacent the end portions. The vertical leg 72 has a pair of bolt receiving apertures 78 and 80 adjacent the tubular strut member 60 (see FIGURE 4).

The cable reel compartment rear vertical wall 22 has a pair of angular fixed brackets 82 and 84 secured thereto by their vertical legs 86 and 88. The vertical legs 86 and 88 may be secured to the vertical wall 22 in any known conventional manner. The fixed bracket 82 has mating apertures 90 and 92 in the horizontal leg 89 which mate with apertures 74 and 76 of angle support bracket 68 secured to tubular strut member 60. The apertures 90 and 92 are clearly illustrated in FIGURE 4. A pin member 94 is secured in aperture 90 and extends through aperture 74 in support member 68. A retaining or locking bolt 96 extends through the other apertures 92 and 76 in members 82 and 68. The upper angle fixed bracket 84 secured to wall 22 has a horizontal leg 98 with a pair of apertures 100 and 102 adjacent the end portions.

The tubular strut member 58 has a horizontal plate or support bracket 104 secured to its under side adjacent the vertical wall 22 of cable reel compartment 14. The plate 104 has a pair of apertures 106 and 108 which mate with apertures 100 and 102 in the horizontal leg 98 of fixed angle bracket 84. A pin member 110 is secured in aperture 100 and extends through aperture 106 in plate 104. A retaining or locking bolt 112 extends downwardly through apertures 108 and 102. The plate 104 has an angle 114 secured thereto. The vertical leg 116 of angle 114 has a pair of bolt receiving apertures 118 extending therethrough. Bolts 120 and 122 secure and further lock the respective angles 68 and 114 to the vertical rear wall 22 of cable reel compartment 14.

The tubular member 58 has an upwardly extending portion 124 with a terminal box 126 secured to its upper end portion. The tubular member 58 forms a passageway for a fixed conductor from terminal box 126 to the inner portion of cable reel carrier 56. A motor support 128 is secured to the top side of strut portion 124 and is arranged to support hydraulic motors 44 and 46 thereon.

The cable reel support 34 provides a support that may be positioned in a cable reel compartment located on either the left side or the right side of the vehicle and still retain the pivotal advantages previously discussed. The reel support illustrated in the drawings is positioned in a cable reel compartment 14 located on the right side of the vehicle and the cable reel support 34 is arranged to pivot clockwise to provide access to the cable reels, cables, hydraulic motors and current collectors.

To position the cable reel support 34 in a cable reel compartment on the left side of the vehicle the same angular fixed brackets 82 and 84 are secured to the vertical wall 22. The pivot pins 94 and 110 are secured in apertures 92 and 102 in fixed brackets 82 and 84. The support brackets 68 and 104 are positioned in overlying relation with fixed brackets 82 and 84 with pins 94 and 110 extending through respective apertures 76 and 108. With this arrangement the reel support 34 pivots counterclockwise about pins 94 and 110 away from the cable reel compartment. The bolts 96 and 112 extend through apertures 106–100 and 74–90 to maintain the reel support within the reel compartment located on the left side of the vehicle.

*Operation*

The cable reels are arranged to be rotatably secured to the cable reel carrier 56 and the cable reel support 34 is, in turn, secured to the vertical wall 22 in the cable reel compartment 14. The angular fixed brackets 82 and 84 are secured to the reel compartment vertical wall 22 by means of welding or the like. The pins 94 and 110 are positioned in respective apertures 90 and 100 and are secured therein by any suitable means such as a press fit or the like. The cable reel support 34 is positioned in the cable reel compartment 14 with the members or brackets 68 and 104 in overlying relation with fixed brackets 82 and 84. The pins 94 and 110 extend through apertures 74 and 106 in members 68 and 104 thus pivotally supporting reel support 34 on fixed brackets 82 and 84. Bolts 96 and 112 extend through the aligned apertures in members 82–68 and 84–104 and serve as a locking means to fixedly secure the cable reel support 34 within the compartment 14. Bolts 120 and 122 extend through the apertures in the reel compartment rear wall 22 and the apertures in members 68 and 114 to further rigidly secure the reel support to the cable reel compartment rear wall.

To pivot the cable reel support 34 outwardly for maintenance of the reels, motors, rotary collectors or the like the bolts 120 and 122 are removed and bolts 96 and 112 are removed. The reel support 34 then freely pivots about pins 94 and 110 to provide access to the above discussed components.

To remove the cable reel support 34 from the compartment all that is required is vertical movement of the support until the members 104 and 68 are free from pin members 94 and 110.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a cable reel support the combination comprising, a cable reel carrier, a pair of strut members secured to and extending rearwardly from said cable reel carrier in angular relation to each other, a pair of laterally extending support brackets secured to said strut members in spaced relation to said reel carrier, each of said support brackets having an aperture therethrough, other fixed brackets adapted to be secured to a vertical wall of a cable reel compartment, said fixed brackets each having a pin member extending vertically therefrom, said pin members in said fixed support brackets extending through said apertures in said laterally extending support brackets to pivotally secure said support brackets to said fixed brackets, and positioning means to fixedly position said laterally extending support brackets in overlying relation to said fixed brackets.

2. In a cable reel support the combination comprising a cable reel carrier, a pair of strut members secured to and extending rearwardly from said cable reel carrier in angular relation to each other, a pair of laterally extending support brackets secured to said strut members in spaced relation to said reel carrier, each of said laterally extending support brackets having a pair of apertures arranged in spaced relation to each other, fixed brackets adapted to be secured to a vertical wall of a cable reel compartment, each of said fixed brackets having a pair of apertures therethrough arranged in spaced relation to each other, said laterally extending support brackets positioned in overlying relation with said fixed brackets with said pair of apertures in each of said support brackets being aligned with a pair of apertures in said adjacent fixed bracket, a pair of pin members extending through certain of said apertures to pivotally secure said support brackets to said fixed brackets, and locking means extending through said other apertures to fixedly position said laterally extending support brackets in overlying relation with said fixed brackets.

3. In a cable reel support arranged to be positioned in a cable reel compartment located on either the left side or the right side of a haulage vehicle comprising a horizontally extending cable reel carrier, a pair of strut members secured to and extending rearwardly from said cable reel carrier in angular diverging relation to each other, a pair of laterally extending support brackets secured to said strut members in spaced relation to said cable reel carrier, one of said support brackets having a horizontal portion and a vertical portion, each of said laterally extending support brackets having a pair of vertical apertures arranged in spaced relation to each other, a pair of fixed brackets arranged to be secured to a vertical wall of a cable reel compartment and having portions extending horizontally therefrom, said fixed brackets each having a pair of vertical apertures extending through said horizontal portions, said laterally extending support brackets positioned in overlying relation with said fixed brackets with said pair of apertures in each of said support brackets aligned with a pair of apertures in said fixed brackets, pin members secured in certain preselected vertical apertures in each of said fixed brackets and extending upwardly therefrom and into said mating apertures of said support brackets to thereby pivotally support said cable reel support on said fixed brackets, and means to secure said support bracket vertical portion to a wall of said cable reel compartment.

4. A cable reel support as set forth in claim 3 in which one of said strut members has an upwardly extending portion, a fixed conduit terminal box secured to an end portion of said upwardly extending portion, a motor support secured to said strut member upwardly extending portion and arranged to support a hydraulic motor for controlling a cable reel rotatably positioned on said cable reel carrier.

5. A cable reel support arranged to support a pair of cable reels in spaced parallel relation to each other within a cable reel compartment of a haulage vehicle comprising a cylindrical cable reel carrier, a pair of strut members secured to and extending rearwardly from said cable reel carrier in angular diverging relation to each other and forming an upper strut and a lower strut, said strut members secured to said cable reel carrier intermediate said cable reel carrier end portions with said cable reel carrier extending horizontally relative to said struts, said cable reel carrier adapted to rotatably support a pair of cable reels with said strut members therebetween, said lower strut having a laterally extending lower support bracket secured to its end portion in spaced relation to said reel carrier, said upper strut member having a support plate secured thereto and extending laterally therefrom, said lower support bracket having a vertical aperture therethrough and said support plate having a vertical aperture therethrough, a pair of fixed brackets adapted to be secured to a vertical wall of a cable reel compartment, said fixed brackets each having a pin member extending vertically therefrom, said support plate and said lower support bracket positioned in overlying relation with said fixed bracket members with said pin members extending through said apertures to thereby pivotally secure said cable reel carrier to said fixed brackets, and positioning means to fixedly position said lower support bracket relative to said fixed bracket.

6. A cable reel support as set forth in claim 5 in which said laterally extending lower support bracket has a pair of apertures adjacent its lateral end portions and said support plate has a pair of apertures adjacent its lateral end portions, said cable reel carrier arranged to be positioned with said pin members extending through a preselected aperture in said lower support bracket and a preselected aperture in said support plate so that said cable reel carrier with said cable reels positioned thereon is arranged to pivot outwardly from said cable reel compartment.

References Cited in the file of this patent

UNITED STATES PATENTS

| | | |
|---|---|---|
| 1,123,602 | Sessions | Jan. 5, 1915 |
| 2,506,880 | Ligler | May 9, 1950 |
| 2,750,153 | Lindgren | June 12, 1956 |
| 3,026,053 | Sisson et al. | Mar. 20, 1962 |